Figure 1:
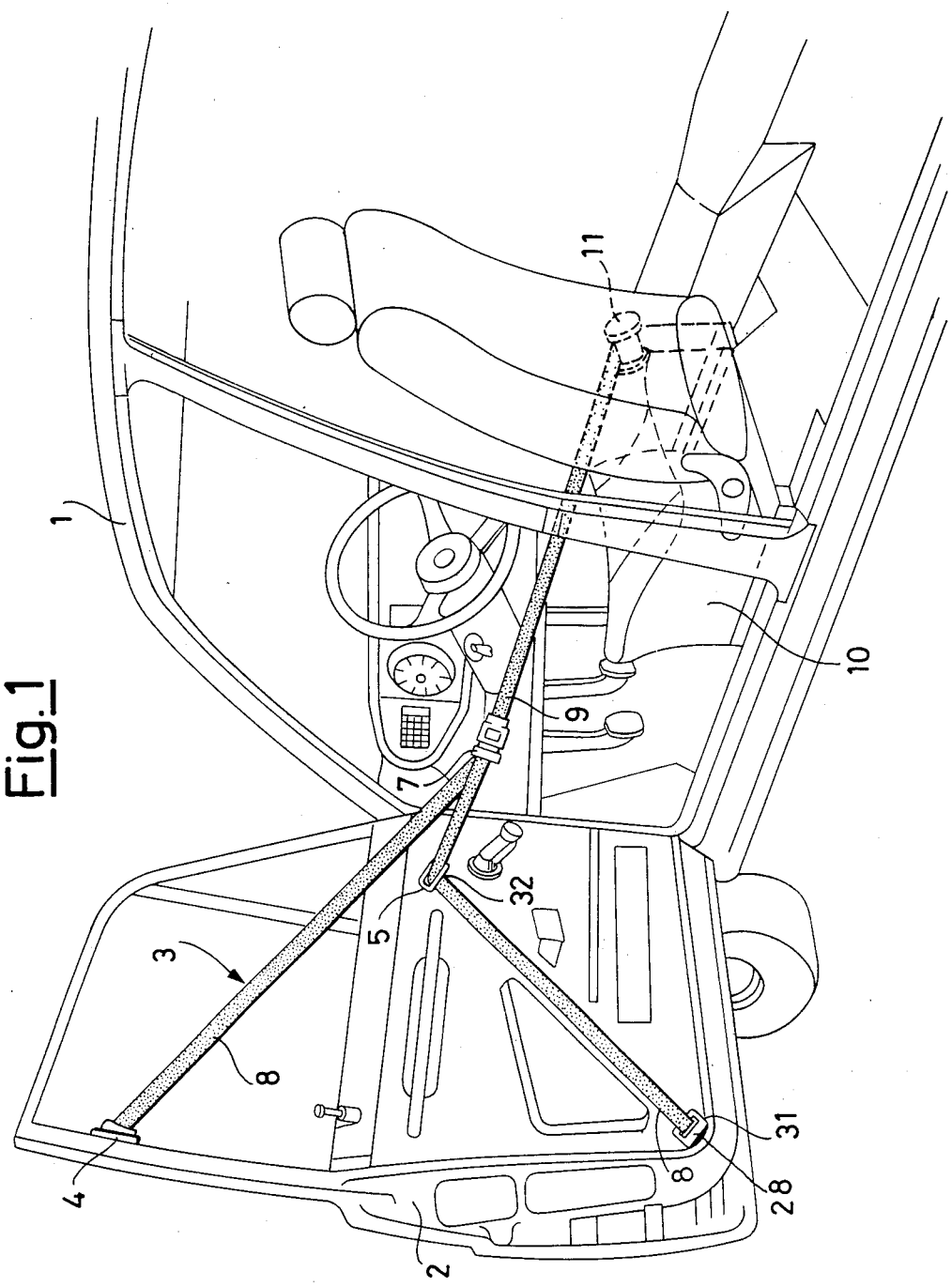

United States Patent
Paludetto

[11] Patent Number: 4,655,476
[45] Date of Patent: Apr. 7, 1987

[54] DOOR ACTUATED SAFETY BELTS

[75] Inventor: Ferdinando Paludetto, Cesano Boscone, Italy

[73] Assignee: Alfa Romeo Auto S.p.A., Naples, Italy

[21] Appl. No.: 802,254

[22] Filed: Nov. 27, 1985

[30] Foreign Application Priority Data

Dec. 3, 1984 [IT] Italy ............................... 23973/84[U]

[51] Int. Cl.⁴ ........................ A62B 35/02; B60R 21/10
[52] U.S. Cl. ..................... 280/804; 180/268; 280/802
[58] Field of Search ............... 280/802, 804; 297/477, 297/483; 180/268

[56] References Cited

U.S. PATENT DOCUMENTS 4,257,625 3/1981 Takada ............................. 280/804
4,437,684 3/1984 Moriya et al. .................... 280/804

Primary Examiner—Richard A. Bertsch
Attorney, Agent, or Firm—Charles E. Brown; Charles A. Brown

[57] ABSTRACT

The invention relates to a self-positioning device for safety belts of the passive type, capable of shifting a movable point of positioning of the same belt, to the purpose of fastening and of releasing the occupant of the seat, by means of the door's shutting and opening stroke, of the type comprising a rack rod of curved shape, rigidly fastened at one of its ends on to the car's body, and a pinion inmeshing with it, rotatably supported by the door and operatively linked to an amplifier mechanism in its turn operatively linked to the belt and capable of transforming the rotary movement of the pinion into an amplified movement of rectilinear type of the same positioning point along a guide diagonally positioned on the door, the rock rod being an anular sector and being partly toothed, so as to operate over a portion of the door's shutting and opening stroke only.

4 Claims, 5 Drawing Figures

DOOR ACTUATED SAFETY BELTS

The present invention relates to a device for efficaciously fastening and releasing the occupant of a motor-car seat, by means of a safety belt of the self-positioning (passive) type, using for the actuation thereof a portion of the vehicle opening stroke or shutting stroke, as suitably selected.

Different devices for the automatic positioning of safety belts around the occupant's body have been recently proposed, some of them being of mechanical type and using lever systems, other ones adopting electrical control means to the purpose of shifting one or more hooking points on to the same belt.

One of such devices is proposed by the U.S. patent Appln. Ser. No. 555,020 filed on Nov. 25, 1983, now U.S. Pat. No. 4,564,217, granted Jan. 14, 1986, and accomplishes a fairly good automatic positioning of the safety belt around the occupant's body.

For the complete disengaging of the passenger from the belt, a nearly total opening of the door is however necessary, and in case of restricted and obliged door opening spaces, it causes some discomfort for the same passenger's getting out of the car.

Purpose of the present invention is in general that of solving such a problem, and in particular that of rendering it possible the passenger to be disengaged from the safety belt also after a very limited door opening.

This purpose is mainly achieved according to the present invention by providing a self-positioning device for safety belts of the passive type, capable of shifting a movable point of positioning of the same belt, to the purpose of fastening and of releasing the occupant of the seat, by means of the door's shutting and opening stroke, of the type comprising a a rack rod of curved shape, rigidly fastened at one of its ends on to the car's body, and a pinion inmeshing with it, rotatably supported by the door and operatively linked to an amplifier mechanism in its turn operatively linked to the belt and capable of transforming the rotary movement of the pinion into an amplified movement of rectilinear type of the same positioning point along a guide diagonally positioned on the door, characterized in that said rack rod is an annular sector and is partly toothed, so as to operate over a portion of the door's closure and opening stroke only.

The said rack rod partly toothed and having an annular sector shape is preferably so positioned as to be concentric with the hinging axis of the door and is provided on one of its sides, in correspondence of a not toothed portion thereof with a groove inside which a stud eccentrically fastened on to said pinion is engaged.

In a preferred embodiment, the device is provided with a sleeve rotatably supported by a pivot fastened on to the door in a parallel position to said pinion, said sleeve engaging a smooth side of the rack rod.

The device comprises preferably a belt provided with bores, operatively linked to the said amplifier mechanism, and a ring solid with the said perforated belt, the said safety belt being fastened at one of its ends on to the door in correspondence of the lowermost point of said guide, and being slidingly supported by the said ring.

Figure 2:
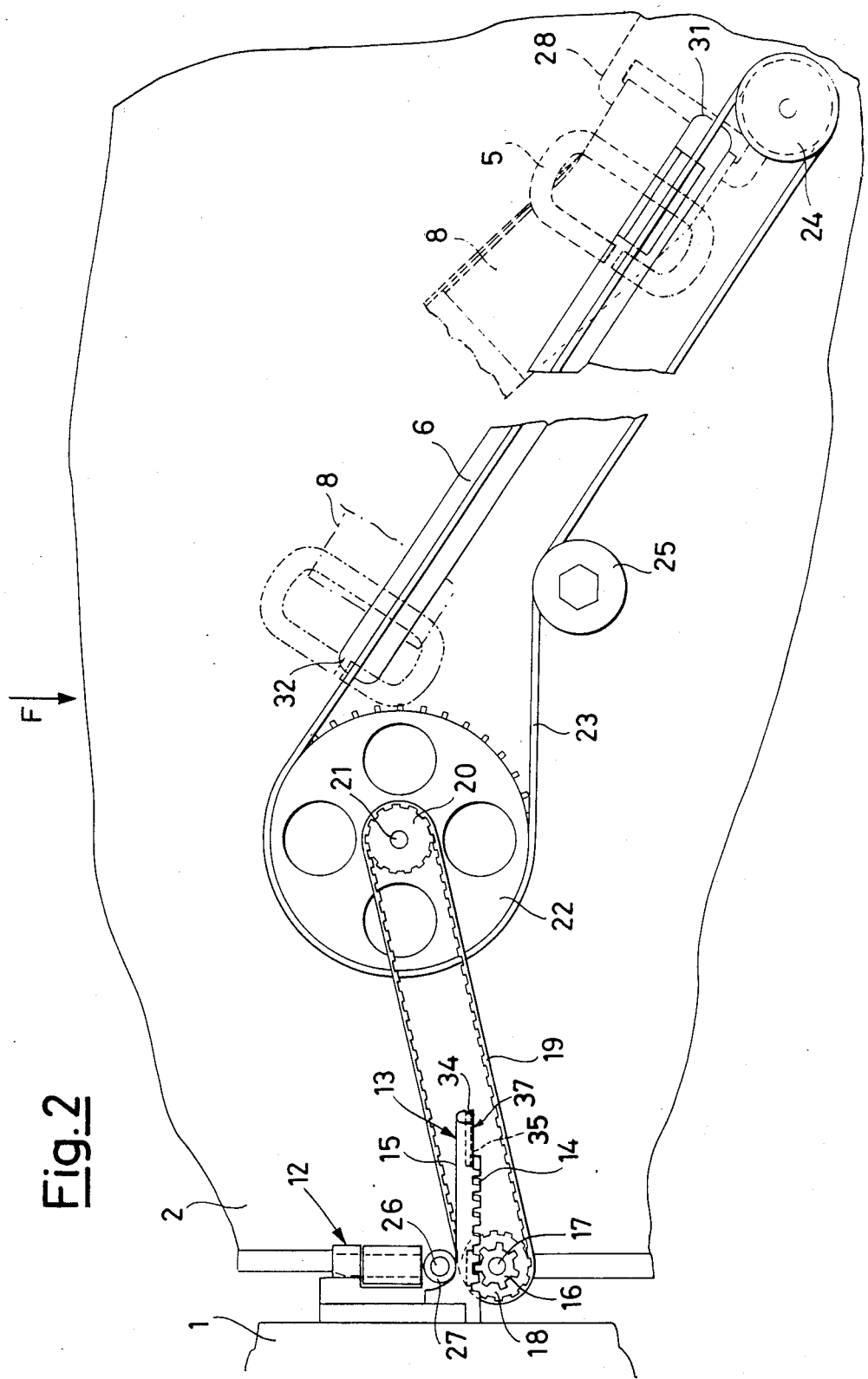
Figure 3:
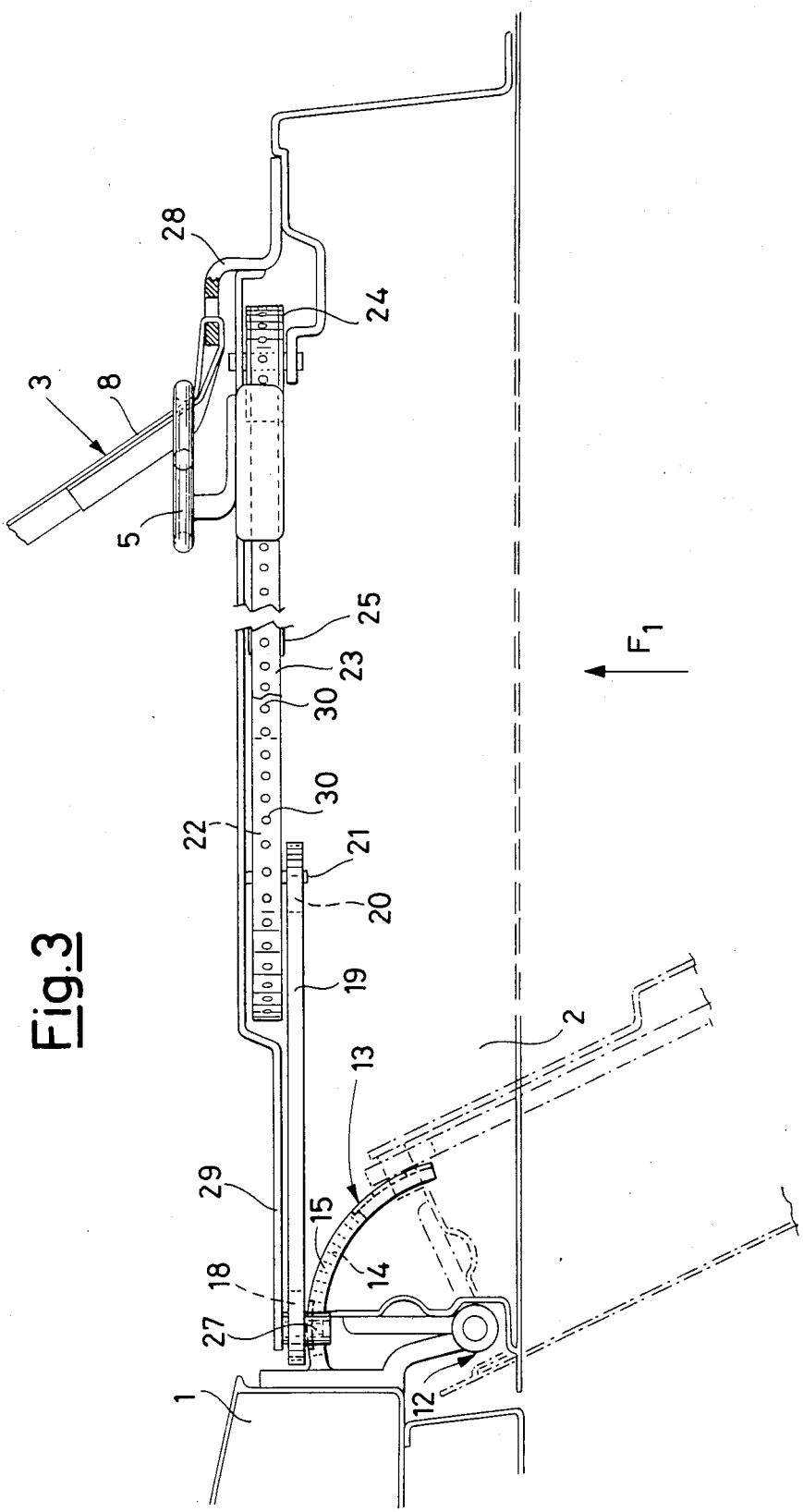
Figure 4:
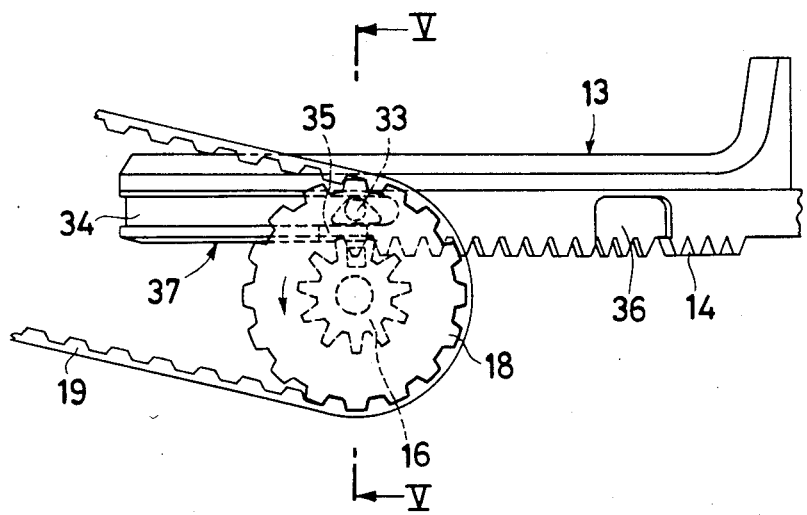
Figure 5:
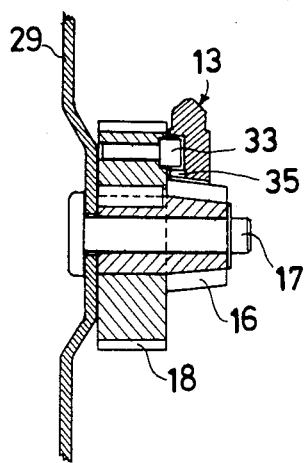

To the purpose of better understanding the characteristics and the advantages of the present invention, hereinunder an exemplifying embodiment thereof is reported, of not limitative character, illustrated in the attached drawings, wherein:

FIG. 1 is a partial view of the interior of a vehicle and of its door, with a belt schematically shown in its release position, provided with a device according to the invention, FIG. 2 is a schematic view of the self-positioning device according to the arrow F1 of FIG. 3, with the door being in its closure position, FIG. 3 is a top view of the device shown in FIG. 2, according to the arrow F, FIG. 4 represents an enlarged detail of the device of FIG. 2, FIG. 5 is a sectional view of the pinion-rack device, indicated in FIG. 4, according to the path plane V—V.

Referring to the drawings, a device for fastening and releasing the occupant of a seat 10, uses a three-points safety belt generally indicated with 3.

Said safety belt 3 is anchored in 4 at an upper end of the door 2, at a bracket 28 in a lower portion of the door 2 and finally at a winding device 11, fastened to the seat 10 or to the car body.

A ring 5, through which the belt 3 passes, slides along a guide 6, fastened on to the door 2, from a point 31 to a point 32 and vice-versa.

A buckle 7 divides the belt 3 into two portions, i.e., a fastening portion 8, constituted by a thoracic branch and by an abdominal branch, and a portion 9 alternatively entering into or coming out of said winding device 11.

In FIG. 2 with 12 a hinge is generally indicated, on which the door 2 rotates relatively to the car body 1, with 13 an annular sector rack is indicated in general, provided with a toothing 14, partly covering its lower portion, and with a flat surface 15, placed on its upper side. The toothing 14 inmeshes with a pinion 16 rotatably mounted on a pivot 17 on which also a first gear wheel 18 is concentrically positioned, of greater diameter than the pinion 16 with which it is solid. A pivot 26 onto which a sleeve 27, positioned parallelly to the pinion 16, is rotatably supported, secures the inmeshing between the toothing 14 of the rack and the pinion 16.

According to the present invention, on a side of the rack 13, in correspondence of a not toothed length 37, a groove 34 is provided, within which a stud 33, fastened in an eccentric position on to the pinion 16, is slidingly engaged through a slot 35. A niche 36 houses the stud 33 after a complete rotation of the pinion 16 on the rack, in order to avoid any interferences between the same stud and the rack. These details can be clearly seen in FIGS. 4 and 5. The said gear wheel 18 is linked through a toothed belt 19 to a second gear wheel 20, rotatably mounted on a pivot 21; a third gear wheel 22 of greater diameter is provided concentrically with and solidly coupled to the wheel 20. With 23 a perforated belt is indicated, on to which the ring 5 is solidly fixed; with 24 a return pulley for the perforated belt 23, and with 25 a belt adjuster idler is indicated.

In FIG. 3 the same details visible in the preceding figures are indicated with the same numbers; with 28 the belt fastening bracket positioned in correspondence of the point 31 on the door 2 is indicated, and with 29 a sheet of the door 2 supporting the amplifier device is shown, and with 30 holes on the perforated belt 23 are indicated.

In the opening operation of the door according to the present invention, two separate and consecutive steps can be taken into consideration. In the first step, the revolving motion of the door 2 on the hinge 12 relatively to the car body 1 on to which the rack rod 13 is rigidly fastened, obliges the pinion 16 positioned on the door 2 to roll on the rack, driving into rotation also the first gear wheel 18 which is solid with the pinion 16. The toothed belt 19 driven in its turn, makes rotate the second gear wheel 20 and the third gear wheel 22, driving the perforated belt 23. The movement of the perforated belt 23 shifts the ring 5, which runs from the point 31 to the point 32 during the partial door opening stroke and is moved to the opposite direction during the corresponding shutting stroke. In the second door opening step, when the stud 33 enters the groove 35 through the slot 34, the pinion 16 is disengaged from the rack toothing 14, moving being guided without rotating up to the complete door opening. The reverse movement is achieved during the related shutting stroke. Such an achievement carries out the twofold function of preventing the return of the movable ring 5 from its stroke-end position 32 during the complete opening of the door and of maintaining the optimum position of inmeshing between the pinion 16 and the inlet of the toothing 14 of the same rack, during the shutting of the door. In such a way, the access to the seat with the partial opening of the door is allowed, useful in case of limited access space, in particularly uncomfortable parking areas, when the complete opening of the door for the passenger's getting in and out of the vehicle is not possible.

With a first movement corresponding to a preestablished door opening angle the safety belt is indeed completely released from the passenger; with a second movement the door can be completely open, while the device remains inactive in its previously taken position 32.

By means of a reverse sequence, relating to the shutting of the same door 2, the safety belt is so positioned as to fasten the occupant on to the seat 10.

I claim:

1. Self-positioning device for vehicle safety belts of the passive type, capable of shifting a movable positioning point of the same belt, to the purpose of fastening and of releasing an occupant of a vehicle seat, by means of a vehicle door's shutting and opening stroke, said device being of a type comprising a rack rod having means for rigidly fastening said rack at one of said rack ends on to a vehicle body, and a pinion in meshing engagement with said rack, rotatably supported by an adjacent vehicle door and operatively linked to an amplifier mechanism in its turn operatively linked to the belt and capable of transforming the rotary movement of the pinion into an amplified movement of rectilinear type of the positioning point along a guide diagonally positioned on the vehicle door, characterized in that said rack rod is an annular sector and is partly toothed so as to operate over a portion of the vehicle door's shutting and opening stroke only.

2. Device according to claim 1, wherein said rack rod is positioned concentric with a hinging axis of said vehicle door and has a groove on one of its sides into which a stud fastened eccentrically to the said pinion is engaged.

3. Device according to claim 1, together with a sleeve rotatably supported by a pivot fastened on to the vehicle door parallel to the said pinion, the sleeve engaging a smooth side of the rack rod.

4. Device according to claim 1, together with a perforated belt operatively linked to the said amplifier device, and a ring solid with the said perforated belt, the safety belt being fastened at an end on to the vehicle door in correspondence of a lowermost point of the said guide, and being slidingly supported by said ring.

* * * * *